United States Patent Office 3,847,860
Patented Nov. 12, 1974

3,847,860
ADHESIVE AGENTS COMPRISING PHENOLIC RESINS AND A MIXTURE OF SILANES
Claus-Dieter Seiler, Rheinfelden, Hans-Joachim Vahlensieck, Wehr, Baden, and Hans Junger, Troisdorf, Germany, assignors to Dynamit Nobel Aktiengesellschaft, Troisdorf, West Germany
No Drawing. Continuation of abandoned application Ser. No. 90,214, Oct. 29, 1970. This application May 8, 1973, Ser. No. 358,752
Claims priority, application Germany, Oct. 29, 1969, P 19 54 354.5
Int. Cl. C08g 51/04; C08k 1/02
U.S. Cl. 260—38
15 Claims

ABSTRACT OF THE DISCLOSURE

Novel mixtures of a plurality of silanes all of the formula:

$$[(R'O)_3\text{—Si—R—}(NH\text{—R})_n]_m\text{—NH}_{3-m}$$

where R is an arylene or alkylene, R' is an aliphatic radical of 1 to 3 carbon atoms, $n$ is 0 or 1 and $m$ is 1, 2 or 3. The use of such mixtures, with each component present in a proportion of at least 5 weight percent, as additives for cold setting and thermosetting bonding agents for inorganic materials to produce bonded products having significantly higher bending and compression strengths.

This is a continuation of application Ser. No. 90,214 filed Oct. 29, 1970, and now abandoned.

The subject of the present invention is adhesive agents. It more particularly refers to the use of such agents in admixture with cold setting and/or thermosetting adhesives, especially organic resins, to form bonds of improved strength between inorganic materials.

It is known that, by the addition of organic silicon compounds, especially γ-aminopropyltriethoxysilane, in quantities of 0.05 to 5 weight percent, to cold setting and thermosetting resins before they are mixed with inorganic substances, compressive strength and bending strength of the bonded product can be improved in comparison to the strength of similar products bonded by resins that have not been prepared using such silane, once the system has been hardened.

It has now been found that, and one aspect of the invention is, a novel mixture of varying amounts of a plurality of silanes of the general formula:

$$[(R'O)_3\text{—Si—R—}(NH\text{—R})_n]_m\text{—NH}_{3-m} \quad \text{I}$$

wherein R is an identical or different alkylene or arylene radical which may contain amino substituent groups, R' is an aliphatic radical having preferably 1 to 3 carbon atoms, $n=0$ or 1 and $m=1$, 2 or 3. The individual silane components of the mixture amount to at least about 5% of the weight of the mixture. The mixture may consist of 2 up to 20 components, preferably about 3 to 6 components, most preferably 4 components.

An additional aspect of this invention is the use of such silane mixtures as additives for cold setting or thermosetting resins which are used for the bonding or in organic solids. Particularly preferred are mixtures of the above-described type in which R and R' are the same and $n$ and $m$ vary within the ranges stated. Examples of mixtures of the above-named type are:

(1) Triethoxysilylpropylamine plus bis-(triethoxysilylpropylamine) and tris-(triethoxysilylpropylamine).
(2) Triethoxysilylmethylamine plus bis-(triethoxysilylmethylamine) and tris-(trethoxysilylmethylamine).
(3) Triethoxysilylphenylamine plus bis-(triethoxysilylphenylamine) and tri-(triethoxysilylphenylamine).
(4) $H_2N\text{—}CH_2\text{—}CH_2\text{—}NH\text{—}CH_2\text{—}CH_2\text{—}Si(OR_3)$ plus

It has been found that adding such silane mixtures, in quantities on the order of 0.02 to 3% of the weight of the resin, to cold setting or thermosetting resin systems brings about a significant increase of the bond strength of products made therewith in comparison to products made with equal percentages of only one of these compounds in pure form instead of mixtures thereof.

Thus increases in the improvement of bending strength were obtained of between 25 and 250% in the case of thermosetting resins and between 60 and 210% in the case of cold-setting resins. In the case of cold-setting resins the use of such silane mixtures was additionally observed to result in an 80% reduction of the setting time required for the achievement of equal final bending strengths, in comparison with resins prepared with one of the aminosilanes in pure form.

The preparation of the aminosilane mixtures used acmethylamine) and tris-(trithoxysilylmethylamine). of ways:
Compounds of the general formula:

in which R represents a chlorine-containing alkylene or arylene radical corresponding to the R in structural formula I above, are reacted either with gaseous ammonia or with polyalkylene imines of the general formula:

$$H_2N\text{—}(R_1NH)_n\text{—}H$$

in which $R_1$ represents an alkylene radical having 2 to 6 carbon atoms, and the silane mixture thus obtained is separated and resolved in a known manner. Also, previously prepared pure aminosilanes with different alkylene radicals can be mixed together in the desired ratio and the mixture thus obtained used according to the invention.

Suitable cold-setting and thermosetting resins within the meaning of the present invention are those products which are formed by the condensation or co-condensation of aldehydes with phenols and/or furfuryl alcohol, and/or urea. Condensation products which form in pH range below 7 can be used as well as those which form in the pH range above 7.

Examples of cold-setting resins are those condensation products which are obtained, for example, by the condensation of one mole of a phenol with 1 to 3 moles of aldehydes in a preferably aqueous, alkaline medium, followed by distillation of the water in a vacuo down to a solids content of 60 to 80%, preferably 70 to 80%. Phenol and its homologs, such as the cresols and resorcinol, xylenols, or mixtures of these compounds can be used as phenols. The aldehydes reacting with the phenols include formaldehyde, compounds which decompose to formaldehyde, such as paraformaldehyde, trioxane or hexamethylenetetramine, acetaldehyde, and furfural, as well as mixtures of these compounds.

Also, co-condensation products of furfuryl alcohol, urea, phenol in some cases, and formaldehyde, can be used as cold setting resins. The individual components are present during the condensation in the following molar ratios:

Phenols _____ 0.1 to 1.0
Urea _____ 0.3 to 1.0
Furfuryl alcohol _____ 0.1 to 1.0
Formaldehyde _____ 2.0 to 4.0

The co-polycondensation of these compounds can be performed in an alkaline medium in a manner analogous to the condensation of the above-mentioned phenol-formaldehyde resins. It has been found to be particularly desirable, in the co-condensation of these compounds, to perform the condensation step by step, with total or partial amounts of the starting components being used in each step.

The urea can be replaced wholly or partially as a reactant by those urea derivatives which are capable of reaction with aldehydes. Examples of such compounds are: thiourea, methylurea, methylolurea, melamine, ammeline or benzoguanamine, and mixtures of these compounds.

Furfuryl alcohol can be replaced wholly or partially by furfurol. Formaldehyde can be replaced by other, previously mentioned aldehydes and formaldehyde precursors. The silane mixture is added into these cold setting resins, preferably in bulk, either during the preparation of the resins, or after they have been prepared and crushed.

Thermosetting resins which are used as binding agents for mineral substances are usually those which are known as novolaks, a term which applies principally to those resins which are obtained by acid and/or alkaline condensation of aldehydes with phenols, while maintaining the ratio of phenols to aldehydes at less than 1:1 respectively.

The condensation is generally performed by heating the phenol with the aldehyde, in an acid medium for example, at temperatures between 60 and 100° C., and holding the condensation mixture at this temperature for between 1 and 4 hours. Then the water is removed by vacuum distillation until the desired resin solids content is reached. The resin obtained in the manner above can, after cooling and crushing, be mixed with a hardener (preferably hexamethylenetetramine) and the silane mixture of this invention. This composition can then be mixed in bonding proportions with a desired inorganic solid. Alternatively, a solution of this resin, preferably in alcohol can be prepared, the silane mixture of this invention added to it, and then this composition is mixed with the inorganic mineral material to be bonded with a hardener.

Suitable inorganic solids are those which offer oxidic surfaces containing hydroxyl groups, an example being $SiO_2$ in the various forms in which it occurs: silicate minerals, quartz sand, and glass in all its manufactured forms, such as fibers, mats, fabrics, laminates, and foamed glass in pellets and granules. Also expanded clay, expanded shale, or minerals containing aluminum oxide and titanium oxide, can be bonded with the above-named resins with the aid of the resin-silane mixture adhesive composition of the invention.

Examples will now be given for the purpose of comparing the effects of the pure silanes used hitherto as additives in cold-setting and thermosetting resins with the effects produced by the use of the silane mixtures of the invention, in regard to the changes they produce in the bending and compressive strengths of mixtures of resins and solids.

Resins suitable for the bonding of foundry sands, for example, can be obtained in the following manner:

RESIN 1

(Cold-setting multiple-component phenolic resin)

660 g. of phenol (90%), 3100 g. of formaldehyde (37% aqueous solution) and 740 g. of urea are heated at 100° C. for 20 minutes in a glass flask provided with stirrer and reflux condenser. After this period, 1540 g. of phenol (90%), 2070 g. of formaldehyde (37% aqueous solution) and 150 g. of technical furfuryl alcohol are added in that order. After the content of the flask is heated to 100° C., 12.7 g. of NaOH (100%) is added drop by drop in the form of a 30 to 40% aqueous solution. After another 55 minutes at 100° C. the condensation has ended. Water is then removed by vacuum distillation until a viscosity of 2500–3000 cp. is reached.

RESIN 2

(Cold-setting phenol-formaldehyde resin)

A mixture of 9 kg. of phenol (90%) and 12.7 kg. formaldehyde (37% aqueous solution) is heated at 100° C. After the addition of 120 g. NaOH the temperature of the mixture is held at 100° C. for 25 to 35 minutes. Then water is removed by vacuum distillation until a viscosity of about 1500 cp. is reached. An additional 5.5 wt. percent of phenol (90%) is added to the resin thus obtained, at a temperature between 25 and 40° C.

EXAMPLE 1

2000 g. of Haltener sand H 32 is mixed with 50 g. of Resin 1, into which 0.2 g. of silane additive has been admixed, and 7.5 g. of a hardener consisting of an aqueous solution of 25 weight percent ammonium nitrate and 40 percent weight urea. The composition was mixed and blended in an appropriate, conventional positive-action mixer. The moist mixture is then put into a molding machine to prepare the test rods. The mixture is molded at a pressure of about 7 atmospheres gauge into a mold heated to 225° C. After various holding periods the mold opens automatically. The rods are removed and, after cooling, are tested for bending strength in a conventional PGF+ strength testing apparatus.

The following values were found:

|  | Bending strength in kp./m.$^2$ after hardening period of — | | | |
|---|---|---|---|---|
|  | 5 sec. | 10 sec. | 15 sec. | 30 sec. |
| Without silane | 64.0 | 76.0 | 81.0 | 72.0 |
| With silane: | | | | |
| A | 67.0 | 76.0 | 81.0 | 90.3 |
| B | 67.0 | 83.0 | 91.0 | 95.0 |
| C | 74.0 | 90.0 | 90.0 | |
| D | 61.0 | 82.0 | 92.0 | 86.0 |

NOTES:
Silane A = γ-Aminopropyltriethoxysilane.
Silane B = γ-Aminopropyltriethoxylsilane plus 40% bis-(triethoxysilylpropylamine).
Silane C = γ-Aminopropyltriethoxysilane plus 60% bis-(triethoxysilylpropylamine).
Silane D = 60% γ-Aminopropyltriethoxysilane, 30-35% bis-(triethoxysilylpropylamine), 5-10% tris-(triethoxysilylpropylamine).

EXAMPLE 2

100 weight-parts of Haltener sand H 32 were intimately mixed with 2.5 weight-parts of Resin 2 containing 0.2 weight percent of silane, and with 16% by volume (with respect to Resin 2) of a hardener consisting of a 60% aqueous solution of p-toluenesulfonic acid.

The mixture is poured into +GF+ test rod molds, and rammed four times with the +GF+ rammer. The rods thus formed were allowed to set at room temperature. At different intervals of time the bending strength was measured by means of the +GF+ strength testing apparatus. The findings were as follows:

|  | Bending strength in kp./cm.$^2$ after setting at room temperature for— | | | | |
|---|---|---|---|---|---|
|  | 1 hr. | 3 hr. | 5 hr. | 8 hr. | 24 hr. |
| Without silane | 4.5 | 18.0 | 19.0 | 18.5 | 20.5 |
| With silane: | | | | | |
| A | 6.0 | 21.5 | 22.0 | 25.0 | 27.0 |
| B | 7.0 | 25.0 | 27.0 | 29.0 | 33.5 |
| C | 8.0 | 25.0 | 27.5 | 30.5 | 31.0 |
| D | 7.0 | 21.0 | 26.0 | 27.5 | 32.5 |

NOTES:
Silane A = γ-Aminopropyltriethoxysilane.
Silane B = γ-Aminopropyltriethoxysilane plus 40% bis-(triethoxysilylpropylamine).
Silane C = γ-Aminopropyltriethoxysilane plus 60% bis-(triethoxysilylpropylamine).
Silane D = 60% γ-Aminopropyltriethoxysilane, 30-35% bis-(triethoxysilylpropylamine), 5-10% tris-(triethoxysilylpropylamine).

What is claimed is:

1. A composite shaped article consisting essentially of an inorganic material having an oxidic surface containing an hydroxyl group and a mixture of at least two distinct silanes, one of which is an aminopropyltrialkoxysilane and another of which is bis-aminopropyltrialkoxysilane or tris-aminopropyltrialkoxysilane, the alkyl group of said silanes having 1 to 3 carbon atoms therein which each silane contributing at least 5 weight percent to the mixture, said composite article containing a thermo or cold setting phenolic resin or thermo or cold setting phenolic resin modified by urea or thermo or cold setting phenolic resin modified by a furan compound selected from the group consisting of furfuryl alcohol and furfural.

2. A composite shaped article according to claim 1 consisting essentially of a siliceous mixture, a mixture of a thermo or cold setting phenolic resin, thermo or cold setting phenolic resin modified by urea or phenolic resin modified by furan and a silane mixture wherein one of said silanes is triethoxysilylpropylamine and another of said silanes is either bis-(triethoxysilylpropylamine) or tris-(triethoxysilylpropylamine), triethoxysilylmethylamine, bis - (triethoxysilylmethylamine), tris - (triethoxysilylmethylamine), triethoxysilylphenylamine, bis-(triethoxysilylphenylamine), tris-(triethoxysilylphenylamine), (aminoethly), trialkoxysilylethylamine and (aminoethyl) di-(trialkyloxysilylpropyl) amine.

3. A shaped article as claimed in claim 2 containing 0.2 to 3.0 weight percent of silane mixture with reference to said resin.

4. A composite shaped article according to claim 3 wherein the silanes comprise a mixture of γ-aminopropyltriethoxysilane and bis-(triethoxysilylpropylamine).

5. A composite shaped article according to claim 4 wherein the mixture comprises 40% of said bis-(triethoxysilylpropylamine), the balance of said mixture consisting of said α-aminopropyltriethoxysilane.

6. A composite shaped article according to claim 4 wherein the mixture comprises 60% of said bis-(triethoxysilylpropylamine), the balance of said mixture consisting of said γ-aminopropyltriethoxysilane.

7. A composite shaped article according to claim 3 comprising a mixture of γ-aminopropyltriethoxysilane, bis-(triethoxysilylpropylamine) and tris-(triethoxysilylpropylamine).

8. A composite shaped article according to claim 7 wherein said γ-aminopropyltriethoxysilane is present in an amount between 30 and 35% and said tris-(triethoxysilylpropylamine) is present in an amount between 5 and 10%, based upon the weight of the silane mixture.

9. In a process for forming a composite shaped article wherein a silane adhesive is employed to bond a thermo or cold setting phenolic resin or a thermo or cold setting phenolic resin modified by urea or a thermo or cold setting phenolic resin modified by a furan derivative selected from the group consisting of furfuryl alcohol and furfural to an inorganic material having an oxidic surface containing a hydroxyl group, the improvement which comprises utilizing as said silane, a silane mixture wherein one of said silanes is a trialkoxysilylpropylamine and another of said silanes is bis-trialkoxysilylpropylamine or tris-trialkoxypropylsilylamine with each silane contributing at least 5 weight percent to the mixture.

10. An improvement according to claim 9 wherein said silane mixture consists of 60% γ-aminopropyltriethoxysilane and 40% bis-(triethoxysilylpropylamine).

11. An improvement according to claim 9 wherein said silane mixture consists of 40% γ-aminopropyltriethoxysilane and 60% bis-(triethoxysilylpropylamine).

12. An improvement according to claim 9 wherein said silane mixture consists of 60% γ-aminopropyltriethoxysilane, 30 to 35% bis-(triethoxysilylpropylamine) and 5 to 10% tris-(triethoxysilylpropylamine).

13. A composite article according to claim 2 wherein the resin is a thermo or cold setting phenolic resin modified by urea.

14. A composite article according to claim 2 wherein the resin is a phenolic resin modified by a furan derivative selected from the group consisting of furfuryl alcohol and furfural.

15. A composite article according to claim 2 wherein the resin is a phenolic resin to which has been added after the composition has set additional phenol.

References Cited

UNITED STATES PATENTS

| | | | |
|---|---|---|---|
| 3,052,583 | 9/1962 | Carlstrom et al. | 260—38 X |
| 3,297,086 | 1/1967 | Spain | 260—38 UX |
| 2,832,754 | 4/1958 | Jex et al. | 260—826 UX |
| 2,971,864 | 2/1961 | Speier | 260—448.8 |
| 3,088,847 | 5/1963 | Pines | 260—826 UX |
| 3,215,585 | 11/1965 | Kneipple | 260—826 UX |
| 3,234,159 | 2/1966 | Cooper | 260—826 X |
| 3,253,948 | 5/1966 | Tiede | 260—826 X |
| 3,331,885 | 7/1967 | Rider et al. | 260—59 X |
| 3,455,725 | 7/1969 | Jex et al. | 260—826 UX |

FOREIGN PATENTS

| | | | |
|---|---|---|---|
| 907,302 | 10/1962 | Great Britain | 260—826 |

HOWARD E. SCHAIN, Primary Examiner

U.S. Cl. X.R.

260—51.5, 56, 59, 448.8 R, 826; 264—331

UNITED STATES PATENT OFFICE
CERTIFICATE OF CORRECTION

Patent No. 3,847,860  Dated November 12, 1974

Inventor(s) Claus-Dieter Seiler et al

It is certified that error appears in the above-identified patent and that said Letters Patent are hereby corrected as shown below:

Column 1, line 62 change "in organic" to "inorganic"

Column 2, line 22 delete the entire line -
"methylamine) and tris-(trithoxysilylmethylamine)."

and insert in lieu thereof
-- cording to the invention can be performed in a number --

Column 4, line 25 change "PGF+" to "+GF+"

Signed and sealed this 22nd day of April 1975.

(SEAL)
Attest:

RUTH C. MASON
Attesting Officer

C. MARSHALL DANN
Commissioner of Patents
and Trademarks